UNITED STATES PATENT OFFICE.

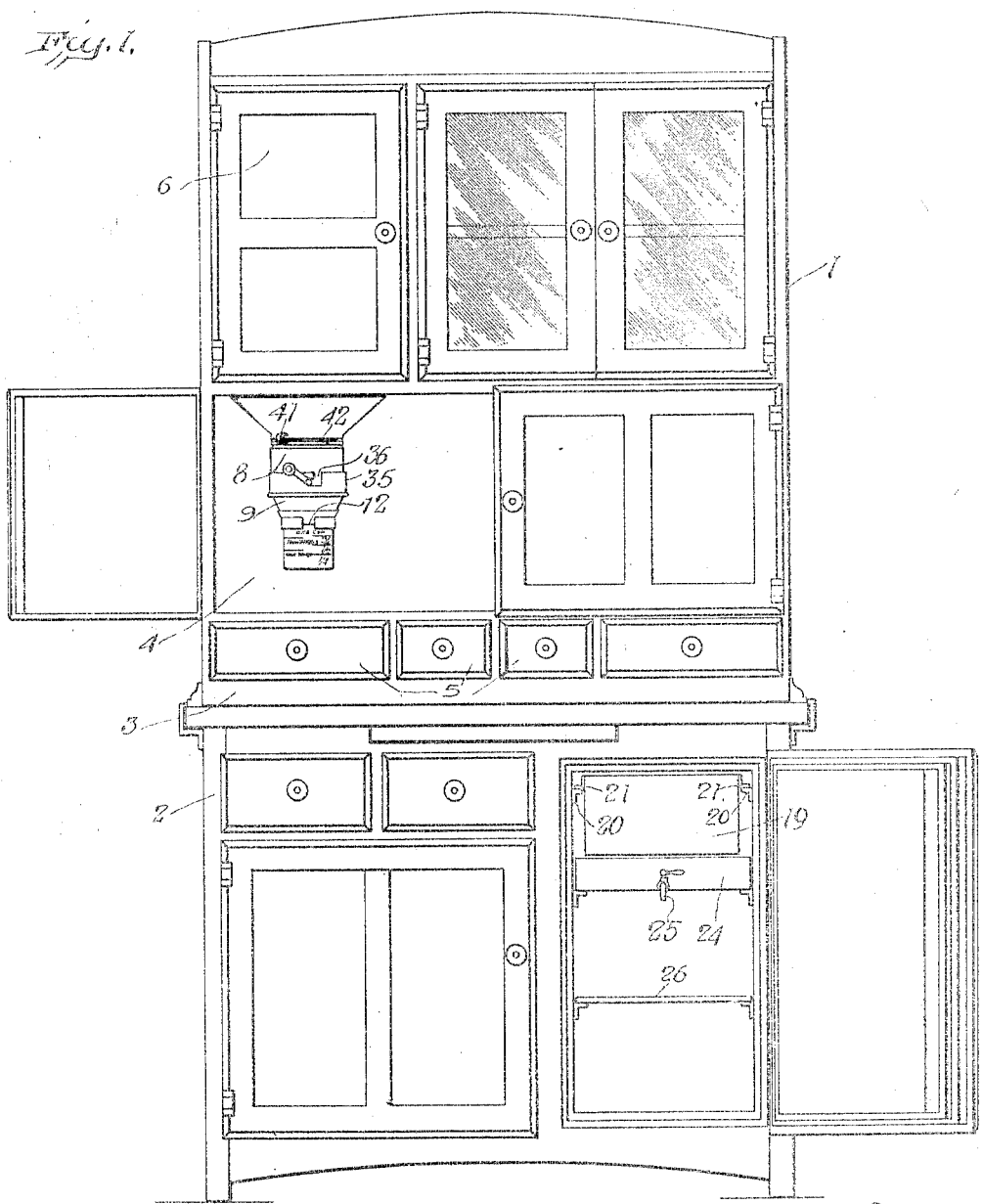

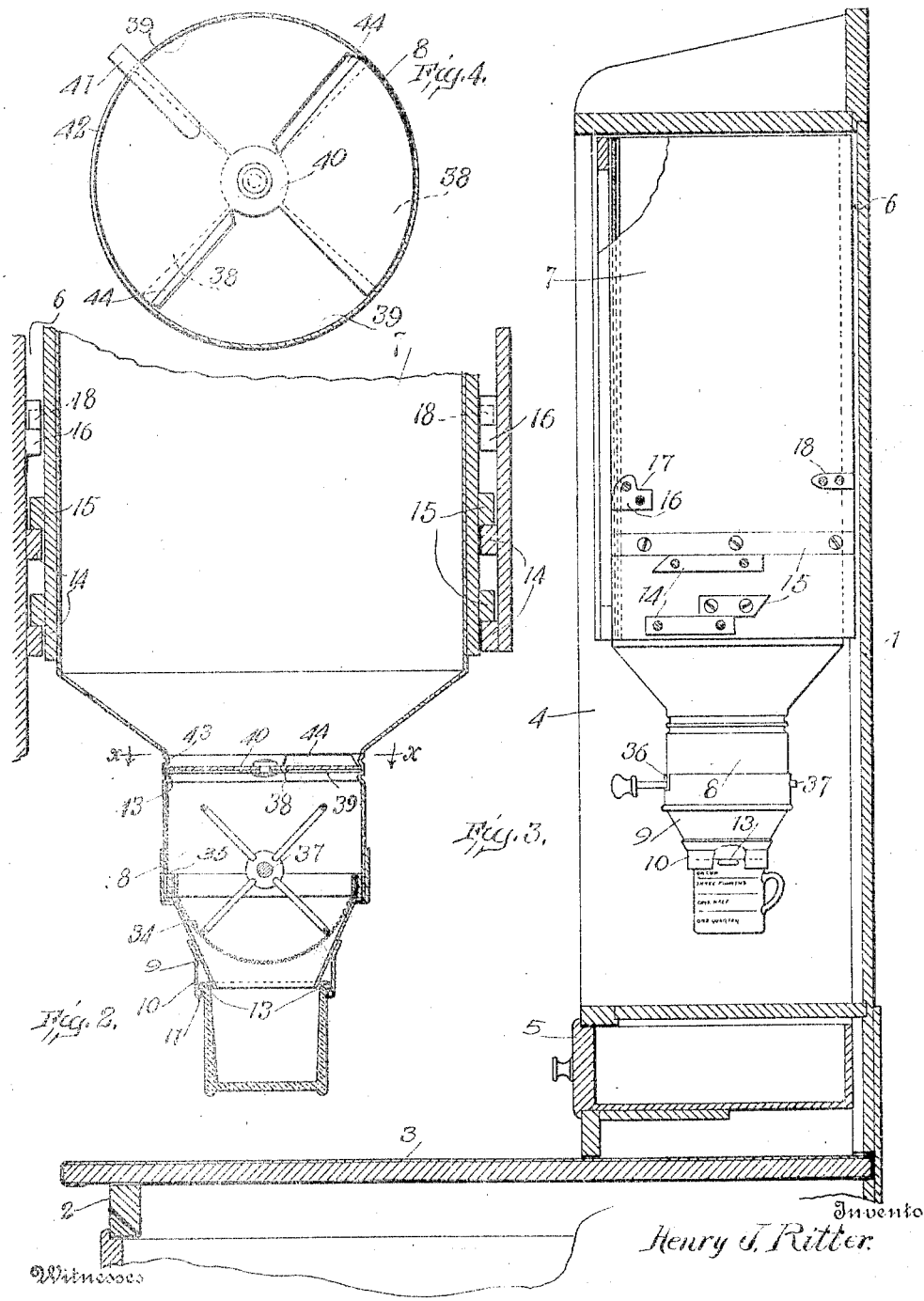

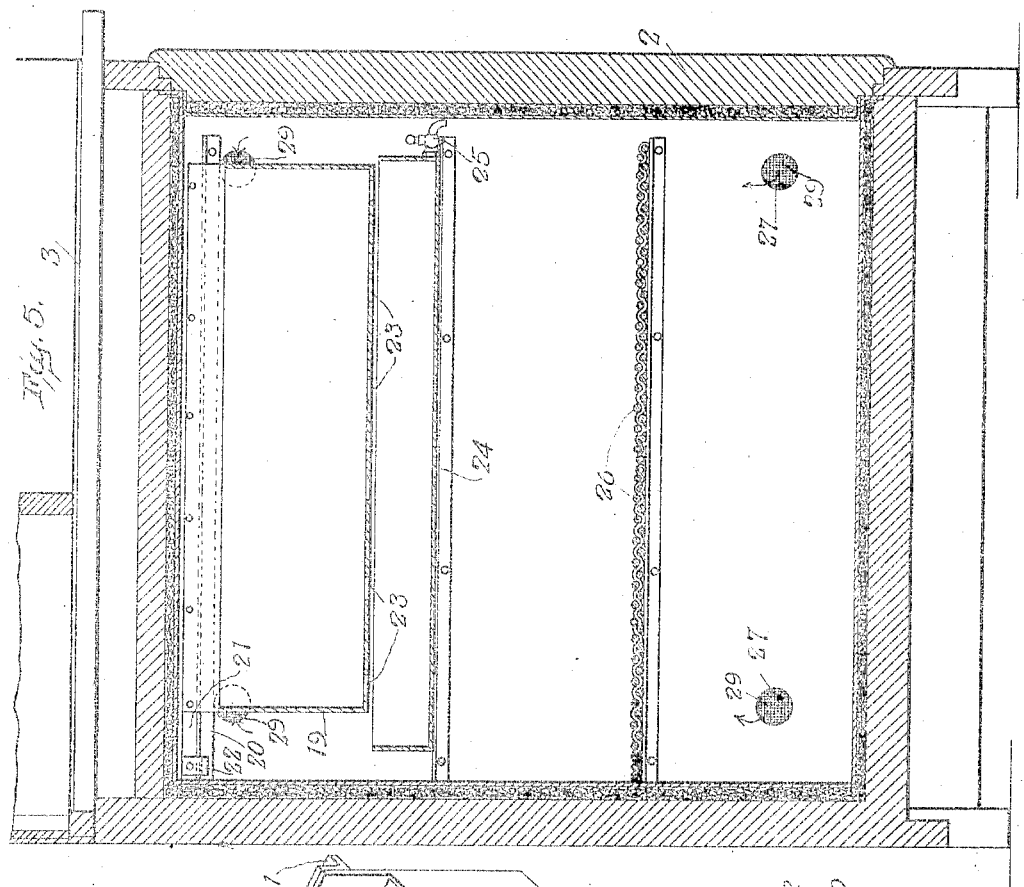

HENRY J. RITTER, OF TIPPECANOE CITY, OHIO, ASSIGNOR TO THE TIPP BUILDING AND MANUFACTURING COMPANY, OF TIPPECANOE CITY, OHIO, A CORPORATION OF OHIO.

KITCHEN-CABINET.

1,081,151.  Specification of Letters Patent.  Patented Dec. 9, 1913.

Application filed June 29, 1911.  Serial No. 636,041.

*To all whom it may concern:*

Be it known that I, HENRY J. RITTER, a citizen of the United States, residing at Tippecanoe City, in the county of Miami and State of Ohio, have invented certain new and useful Improvements in Kitchen-Cabinets, of which the following is a specification, reference being had therein to the accompanying drawing.

This invention relates to kitchen cabinets.

The object of the invention is to provide a kitchen cabinet of a compact, convenient arrangement, and having the several parts thereof so arranged and of such a character that they will be easy of access and readily manipulated.

To this end it is a further object of the invention to provide the cabinet with a flour bin having a sifter, the screen portion of which may be removed, and having means for attaching thereto a transparent measuring cup; and to so support the bin that it may be moved outward and into an inclined position to enable the flour to be placed therein and may be readily removed for cleaning.

It is a further object of the invention to provide such a cabinet having a refrigerator formed therein and comprising a part thereof, this refrigerator being of such a character as to enable the ice to be readily inserted therein and having food-supporting devices of such a character and so arranged as to enable the space to be utilized to the fullest extent.

In the accompanying drawings, Figure 1 is a front elevation of a kitchen cabinet embodying my invention; Fig. 2 is a sectional view, taken vertically of the lower portion of the flour bin on a plane extending parallel with the front of the cabinet; Fig. 3 is a sectional view, taken vertically through the upper portion of the cabinet on a plane extending parallel with the side wall of the cabinet and showing the flour bin in elevation; Fig. 4 is a sectional view taken on the line x x of Fig. 2 and looking in the direction of the arrows; Fig. 5 is a vertical, sectional view of the refrigerator portion of the cabinet; Fig. 6 is a detail view of the ice receptacle for the refrigerator; and Fig. 7 is a detail view showing one of the ventilating openings for the refrigerator.

In these drawings I have illustrated one embodiment of my invention and have shown the same as applied to a kitchen cabinet, the main features of construction of which are well known.

As here shown, the cabinet comprises an upper portion 1 and a lower portion 2, each divided into a plurality of compartments. The upper portion of the cabinet is of less depth than the lower portion thereof and the top of the lower portion constitutes a working table, as indicated at 3. The main compartment 4 of the upper portion of the cabinet is closed by swinging doors. In order that these doors may be opened and closed without necessitating the removal of the articles ordinarily used in the working table 3 I have arranged the bottom of the compartment 4 some distance above the level of the work table so that the doors, when swung into their open or closed positions, will clear the table top by several inches. The space between the bottom of the compartment 4 and the level of the table top 3 is utilized by providing the same with a series of drawers 5. Mounted in a compartment 6 arranged above the main compartment 4 in the upper portion of the cabinet is a flour bin 7 having a hopper-like lower portion which extends into the main compartment 4. The lower end of the hopper-shaped bottom of the flour bin is provided with a flour sifter 8 and means are preferably provided for supporting a transparent measuring cup immediately beneath the sifter so that the amount of flour delivered from the bin to the receiving cup may be accurately gaged. To this end a discharge conduit, such as a hopper 9 is secured to the bottom of the sifter 8 and has its discharge end of such a size that it will enter the measuring cup. Secured to and extending slightly below the lower edge of the hopper 9 is an annular flange 10 provided at its lower edge with an inwardly extending annular bead 11 and having formed in the opposite sides thereof vertical slots or openings 12 adapted to receive lugs 13 formed on the outer side of the measuring cup and near the top thereof. When it is desired to withdraw flour from the bin the lugs 13 of the cup are inserted in the openings 12 of the flange 10 and the cup partially rotated to cause the lugs to engage the bead 11 which will support it in its proper position beneath the flour sifter. The cup being of glass or other transparent material the amount of flour which has been sifted into it can be readily determined at any time. The simplicity of the connecting device makes it possible to connect the cup to and disconnect the same from the sifter with a minimum amount of trouble. It will be noted that this measuring cup also serves as a cap to close the discharge end of the hopper and prevent particles of flour from dropping from the sifter when the latter is not in use.

It is desirable that some means should be provided to enable the sifter to be cleaned without the necessity of removing and emptying the bin. To permit of this I have so constructed the sifter that the portion thereof which carries the screen can be detached and I have also provided a cut-off to prevent the flour escaping from the hopper when said portion of the sifter has been removed. In the form of the device here shown I have secured the screen 34 to an annular frame 35 of such a size that it will fit snugly about the body portion of the sifter 8. This frame or ring 35 may be secured to the body portion of the sifter, which is rigidly secured to the hopper, in any suitable manner, preferably by the hopper 9, having bayonet slots 36 formed in the opposite sides thereof and engaging parts projecting from the body portion of the sifter. In this construction the ends of the shaft 37 which carries the agitator for the sifter project beyond the outer surface of the body portion thereof and form lugs to enter the bayonet slots 36. It becomes apparent that by imparting a short turning movement to the lower portion of the sifter the screen can be removed and cleaned or renewed. Arranged immediately above the sifter is a cut-off which is here shown as comprising a lower disk 38 having openings 39 through which the flour may pass to the sifter when the cut-off is in its inoperative position. Pivotally mounted on the lower or fixed plate 38 is an upper plate 40 having wings arranged to close the openings 39 in the fixed plate 38 and thus prevent the flour from passing from the hopper. This upper or movable plate is preferably actuated by a thumb piece 41 extending through a slot 42 formed in the side wall of the body portion of the sifter near the base of the hopper. The plates 38 and 40 may be supported in position in any suitable manner, but, in the present instance, I have mounted them between two beads 43 formed in the body portion of the sifter. These beads serve not only to retain the two plates forming the cut-off in their proper positions, but the upper bead prevents the flour from escaping through the slot 42 which is formed between the two beads. I have also provided the wings of the pivoted plate 40 on their forward edges with upwardly extending flanges 44 which will engage the flour resting on those portions of the fixed plate 38 between the openings 39 and scrape a portion of the same off the plate and through the openings therein, thus preventing the same flour remaining upon the fixed plate for a long period of time and becoming stale. While I have referred to the cut-off as formed in the body portion of the sifter it will be understood that the body portion of the sifter is, in the present instance, merely a continuation of the hopper and that the cut-off may be arranged at any suitable point above the screen of the sifter.

In order to enable the bin to be filled I have provided supporting devices therefor which will permit it to be partially withdrawn from its compartment and the upper end thereof tilted forward. To this end the side walls of the compartment have rigidly secured thereto short tracks or bars 14 and the bin has secured to the opposite sides thereof corresponding bars 15 which rest upon the bars 14 and support the bin within this compartment and permit the same to be withdrawn therefrom. Stop blocks 16 are secured to the side walls of the bin near the forward edge thereof above the level of the uppermost bar 14 and have their upper rear corners cut away to form recesses 17 which are preferably rounded. Secured to each side of the bin near the rear edge thereof is a stop or lug 18 having a rounded nose adapted to engage the recess 17 of the block 16. When the bin is to be filled it is drawn outward until the stop 18 engages the blocks 16 and is then tilted about the point of engagement of these two parts. The tilting movement is limited in the present instance by the rear end of the lower bar 15 coming in contact with the front end of the lower bar 14. The rear end of the bar 15 is preferably inclined to provide a broader contact surface. This construction enables the bin to be quickly and easily tilted into position to be filled and is of such a simple character that there is no liability of its becoming disarranged or inoperative. This construction also enables the bin to be easily removed for cleaning or for other purposes. To remove the bin it is only necessary to move it to its outermost position and then lift the same to disengage the lug 18 from the block 16.

In one of the compartments in the lower portion of the cabinet and preferably in the one having a height equal to the full height of this portion of the cabinet is built a refrigerator. The ice box is, in the form of a drawer, as indicated at 19, and is slidably mounted in the upper portion of the compartment to enable it to be withdrawn and filled with ice. In the construction here shown the ice receptacle is supported on tracks 20 comprising angle irons secured to the respective side walls of the compartment. Secured to the opposite sides of the receptacle are guides 21 also formed of angle iron and adapted to rest upon the tracks 20 and support the receptacle 19 in position within the compartment. The guides 21 preferably extend beyond the rear end of the receptacle and are provided near their rear ends with depending clips 22 having outwardly turned lower ends arranged to extend beneath the tracks 20 and thus prevent the receptacle tilting when it is moved outward a distance sufficient to carry the entire body portion thereof beyond the front of the cabinet. The ice receptacle is provided with suitable outlet openings 23 and a drip pan 24 is removably supported beneath the same. This drip pan, in addition to being removable, may be provided with a faucet 25 to permit the water to be drawn off without removing the receptacle. The space beneath the ice receptacle and drip pan is preferably divided into two chambers by means of a suitable shelf or tray 26. In the present instance I have shown this tray as formed in two parts, either of which may be removed independently of the other. In this manner I am enabled to utilize the full height of the space below the drip pan 24 either at the front or rear of the compartment and, at the same time, retain the dividing shelf in the opposite end of the compartment. Thus, if it is desired to place a melon or other large article in the rear of the refrigerator, the tray may be removed, and, after the melon is in place, one portion of the tray may be inserted in front of the melon, thus dividing the forward part of the compartment into two chambers, both of which may contain articles of food. During those seasons of the year when it is not desired to utilize this part of the cabinet as a refrigerator it may be used as a food receptacle and at such times means may be provided for ventilating the same. To this end I have provided ventilating openings 27 in the side wall of the compartment. Tubes 28 are preferably mounted in the ventilating openings, are provided at their inner ends with screens 29 and at their outer ends with suitable closures. In the present construction the tubes have their outer ends projecting beyond the outer wall of the compartment to receive caps 30. These tubular linings may be secured in position in any suitable manner. In the present instance I have mounted a short sleeve 31 about the projecting end of each tube and have provided this sleeve at its outer end with an inturned flange or shoulder 32 adapted to engage the end of the sleeve and at its opposite end with an outturned flange 33 adapted to be secured to the wall of the cabinet. The outer surface of the sleeve may be provided with a screw-thread to receive the screw-threaded cap 30. When the compartment is in use as a refrigerator the caps will be placed on the ends of the tubes 28 to close the openings, but, when the compartment is used merely as a food receptacle, the caps are removed to permit the air to circulate freely through the compartment.

It will be apparent, therefore, that I have provided a kitchen cabinet which is not only compact but has the several parts thereof of such a character as to enable them to be utilized to the best advantage and with a minimum amount of labor, and that the flour bin can be readily filled and any desired amount of flour measured out of the same.

I wish it to be understood that I do not desire to be limited to the details of construction shown and described, for obvious modifications will occur to a person skilled in the art.

Having thus fully described my invention, what I claim as new and desire to secure by Letters Patent, is—

1. In a kitchen cabinet, a flour bin, means for slidably supporting said bin within said cabinet, and stops to limit the forward movement of said bin and permit the tilting thereof, said stops being separable to permit said bin to be removed when in its foremost position and said supporting means holding said bin against tilting until said stops become operative.

2. A kitchen cabinet having a compartment, a flour bin mounted in said compartment, bars rigidly secured to the walls of said compartment on opposite sides of said bin, said bars terminating at a point removed from the front of said compartment, bars rigidly secured to the opposite sides of said bin above said first-mentioned bars and terminating at points removed from the rear wall of said bin, a stop block rigidly secured to the side walls of said compartment above said bars, and stops carried by said bin and arranged to engage said stop blocks to limit the forward movement of said bin and to form a center about which the bin may be tilted, the rearward movement of the lower portion of said bin being limited by the rear ends of the bars carried by said bin engaging the forward ends of the bars secured to the walls of said compartment.

3. A cabinet having a compartment, an ice receptacle movably supported in the upper portion of said compartment, ventilating openings formed near the top and bottom of said compartment, tubular linings mounted in said openings and projecting beyond the outer ends thereof, sleeves surrounding the projecting ends of said tubular linings having inturned flanges at the outer ends thereof to engage the ends of said tubes and outturned flanges at the inner ends thereof to be secured to the walls of said cabinet, and caps removably mounted on said sleeves to close the ends of said tubular linings.

4. In a kitchen cabinet, a flour bin having a hopper, a cylindrical extension to said hopper having a pair of annular beads and provided with a circumferential slot between said beads, a plate mounted within said extension and between said beads and having openings therein, a second plate pivotally mounted on the first-mentioned plate between said beads and having wings adapted to close said openings and upwardly extending flanges to engage the flour on those portions of said first-mentioned plate between said openings, a thumb piece secured to said pivoted plate and extending through said slot, a screen detachably secured to the lower end of said extension, and an agitator mounted within said extension.

5. In a kitchen cabinet, a flour bin, means for slidably supporting said bin within said cabinet, and stops to limit the forward movement of said bin and to act as a center about which said bin may be tilted, said stops being in a different plane than said supporting means and separable to permit said bin to be removed when in its foremost and tilted position.

6. The combination, with a flour bin having a discharge conduit provided with a reduced lower end, a sifter interposed between the body of said bin and the lower end of said discharge conduit, and an annular flange depending from said conduit and having an inwardly extending bead and a plurality of vertical slots at the lower end thereof, said lower end being spaced away from the lower end of said discharge conduit, of a measuring cup adapted to have its upper edge inserted between said flange and the lower end of said conduit, and having a plurality of lugs adapted to enter the respective slots in said flange and engage said bead when said cup has been partially rotated.

7. In a kitchen cabinet, the combination, with a flour bin having a discharge conduit, and a sifter interposed between the body of said bin and the lower end of said discharge conduit, of a cup removably supported below said conduit so that its upper edge extends above and surrounds the lower end of said discharge conduit.

8. In a kitchen cabinet, the combination, with a flour bin having a part constituting a discharge conduit, and a second part secured to said first-named part and depending therefrom, of a cup adapted to have its upper edge inserted between said parts, and means for removably supporting said cup in the path of said conduit.

9. In a kitchen cabinet having a compartment, a flour bin mounted in said compartment, a pair of bars secured to each side wall of said compartment, a pair of bars secured to each of the side walls of said bin and adapted to engage said first-mentioned bars and slidably support said bin, a stop block secured to said compartment, and a stop secured to said bin and adapted to limit the forward movement of said bin, said bars being arranged to permit tilting of said bin when said stop and block are in engagement and to limit the rearward movement of the lower portion of said bin.

In testimony whereof, I affix my signature in presence of two witnesses.

HENRY J. RITTER.

Witnesses:
ELLIS DAVIS,
WILL H. LONG.